United States Patent [19]

Winter et al.

[11] Patent Number: 4,553,313
[45] Date of Patent: Nov. 19, 1985

[54] SYSTEM TO AUTOMATICALLY CHANGE TOOL BLOCKS USED ON TURNING MACHINES

[75] Inventors: Rudolph R. Winter, Bloomfield Hills; Verle V. Propst, Rochester, both of Mich.

[73] Assignee: Borg-Warner Corporation, Chicago, Ill.

[21] Appl. No.: 452,539

[22] Filed: Dec. 23, 1982

[51] Int. Cl.[4] .............................................. B23Q 3/157
[52] U.S. Cl. ...................................... 29/568; 82/36 B; 414/735
[58] Field of Search ............ 82/36 A, 37, 36 R, 36 B; 29/568; 414/741, 735

[56] References Cited

U.S. PATENT DOCUMENTS

| | | | |
|---|---|---|---|
| 2,540,289 | 2/1951 | Randall | 82/36 |
| 2,684,608 | 7/1954 | Roman | 82/37 X |
| 3,130,618 | 4/1964 | Drantz | 82/37 |
| 3,425,305 | 2/1969 | Cocco | 82/37 X |
| 3,513,734 | 5/1970 | Burroughs et al. | 29/568 X |
| 3,680,416 | 8/1972 | Van Dijk | 82/36 |
| 3,738,206 | 6/1973 | Parsons | 82/37 |
| 3,752,020 | 8/1973 | George et al. | 82/36 R |
| 3,867,756 | 2/1975 | Koch et al. | 29/568 |
| 3,901,108 | 8/1975 | Slavinski et al. | 82/36 R |
| 3,948,123 | 4/1976 | Dams et al. | 82/24 R |
| 3,954,188 | 5/1976 | Boyle | 414/735 |
| 4,055,095 | 10/1977 | Granespacher | 29/568 X |
| 4,057,294 | 11/1977 | Krekeler | 299/93 |
| 4,072,236 | 2/1978 | Nomura et al. | 29/568 X |
| 4,336,926 | 6/1982 | Inagaki et al. | 269/34 |
| 4,343,077 | 8/1982 | Satoh et al. | 29/568 |
| 4,344,220 | 8/1982 | Sachot | 29/568 |
| 4,416,577 | 11/1983 | Inaba et al. | 29/568 X |

FOREIGN PATENT DOCUMENTS

| | | | |
|---|---|---|---|
| 0007077 | 1/1980 | European Pat. Off. | 82/36 B |
| 3023539 | 1/1982 | Fed. Rep. of Germany | 29/568 |
| 2045720 | 11/1980 | United Kingdom | 414/735 |

Primary Examiner—William R. Briggs
Assistant Examiner—Glenn L. Webb
Attorney, Agent, or Firm—James A. Geppert

[57] ABSTRACT

A system for quickly changing tool blocks for a turning or other machine wherein the tool block is shifted between a set-up fixture and the turning machine by an appropriate means such as a robot arm. The tool block is provided with a vertical keyway and parallel horizontal dovetails utilized as reference surfaces for tool set-up and as clamping surfaces in the machine or mounting fixture. The block has appropriate clamping members to retain one or more turning tool bits in operative position for use in the machine.

7 Claims, 5 Drawing Figures

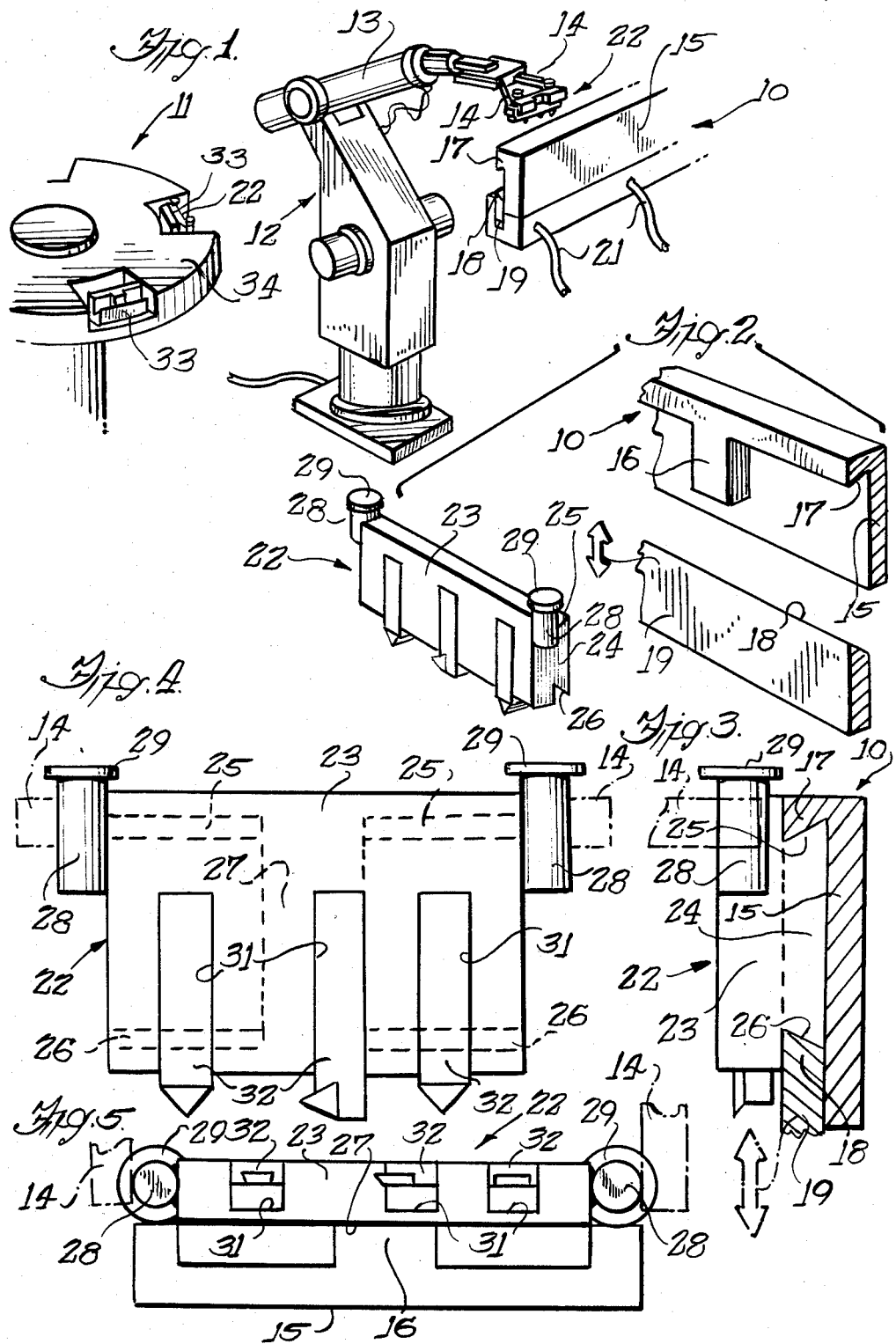

SYSTEM TO AUTOMATICALLY CHANGE TOOL BLOCKS USED ON TURNING MACHINES

BACKGROUND OF THE INVENTION

It has been common practice to provide various types of cutting tools in a tool block which are retained by means of clamping screws in the block. Such blocks are commonly formed with a dovetail slot or other suitable means for mounting the block on a machine tool. Normally, machine tools utilizing these tool blocks are set up for a new job without removing the block from the machine. Thus, the cutting tools previously used are removed from the block and a new tool or tools are inserted, calibrated and secured in place. It is well known that the procedure for setting up a machine tool for a new job may take many hours. Also, if a tool becomes dull or broken, the machine is down while the tool is sharpened or replaced.

It is possible to reduce the several hours of downtime where the machine must remain inoperative while setting up for a new job, by calibrating tools in their respective tool blocks to be employed in the next job while the machine to receive such tool block is engaged in carrying out a previous job. Also, various types of tool holders have been tried to quickly mount the tool block in the machine, such as by spring-loaded clamping means which may be manually or hydraulically retracted to release the tool block and replace it with an alternate block.

With the advent of robots used for assembly and other operations, it would appear that tool blocks could be quickly and easily replaced or changed, and the present invention relates to a tool holder system which lends itself to the use of a robot arm under manual or remote control for the quick change of tool holders.

SUMMARY OF THE INVENTION

The present invention comprehends the provision of a novel system to automatically and quickly change tool blocks used on a turning machine or other machine tool. The system includes a mounting fixture on the machine, a set-up fixture for the tool block, and means, such as a robot arm to transfer the tool block from the set-up fixture to the machine and vice versa. Thus, with two stations in the set-up fixture, a tool block could be set up for a machine operation while a second tool block is used in the machine. To change operations or replace dull tools, the robot arm removes the block in the machine and transfers it to the fixture, and then lifts the set-up tool block from the fixture and inserts it in the machine.

The present invention also comprehends the provision of a novel system to quickly change tool blocks where the machine holder for the tool block has a pair of horizontally arranged parallel dovetails complementary to dovetails on the tool block, and the block has a vertical keyway used as a reference surface receiving a vertical rib in the block holder in the machine. The lower dovetail in the machine holder is vertically movable to releasably clamp the tool block in the machine holder and precisely position the tool or tools in the machine for the requisite machining operations.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a perspective schematic view of a tool block holder for a machine, a set-up fixture and a robot transfer arm utilized in the present invention.

FIG. 2 is a partial exploded perspective view of the tool block and machine holder therefor.

FIG. 3 is a vertical cross sectional view through the tool block and holder.

FIG. 4 is a front elevational view of the tool block.

FIG. 5 is a bottom plan view of the tool block and holder.

DESCRIPTION OF THE PREFERRED EMBODIMENT

Referring more particularly to the disclosure in the drawing wherein is shown an illustrative embodiment of the present invention, FIG. 1 discloses a tool block holder 10 for a suitable turning machine (not shown), a set-up fixture 11 and a robot 12 having a pivotally mounted arm 13 terminating in gripping jaws or fingers 14; the arm being capable of vertical and horizontal movement and swinging movement between the tool block holder 10 and the set-up fixture 11. The tool block holder or mounting fixture 10 includes a supporting member 15 with a vertical key 16 and parallel horizontal dovetails 17 and 18; the upper dovetail 17 being integral with the member 15 and the lower dovetail 18 being vertically slidable relative to the upper dovetail 17 by an air-operated wedge lock actuator 19 having one or more air conduits 21 communicating with a source of air pressure. Thus, the upper dovetail 17 is fixed to provide a locating surface and the lower dovetail 18 is slidable to provide the clamping surface.

A tool block 22 for the turning machine includes a body 23 with a rearward clamping member 24 having an upper dovetail 25, a parallel lower dovetail 26 and a central vertical keyway 27, all complementary to the key 16 and dovetails 17 and 18 in the holder on the machine. Also, a pair of generally cylindrical gripping members 28,28 are located at the opposite ends of the block 22; each gripping member being provided with an enlarged head or support ledge 29 over the gripping surface. Formed in the block are one or more slots 31, each slot adapted to receive a cutting tool 32 clamped therein by a suitable means, such as bolts, received in threaded openings so that the inner ends of the screws engage the support base of a cutting tool 32 located in a slot 31.

The gripping jaws or fingers 14 on the robot arm 13 are opposed and have rounded or angular gripping surface adapted to engage the gripping members 28 of the tool block. The fingers reciprocate to grip and release the tool block and are suitably actuated, as by air pressure. If there is a loss of air pressure in the robot arm so there is a loss of gripping pressure by the fingers 14, the support ledges 29 will rest on the fingers to prevent an accidental dropping of the tool block and reduce the possibility of damage to the tool holding block and/or cutting tools.

The tool block set-up fixture 11 utilizes a holder 33 similar to the holder supporting member 15 so that the tool block will be clamped against its reference surfaces 25, 26 and 27, and the cutting tools 32 can be manually adjusted to the required positions for the turning machine by the use of dial indicators mounted on a gage fixture. The fixture is provided with a dial index table 34 of any suitable design or configuration with the holders or fixtures 33 for receiving used tool blocks and supply previously set up tool blocks to the automatic robot arm changer. After all of the cutting tools have been adjusted, the block 22 is set on the proper fixture 33 on the dial index table ready for removal by the robot arm 13.

The automatic changer can be designed for changing tool blocks only or also to load and unload workpieces and/or work holding fixtures to one or more machines, including the machines the tool blocks are used on. The machines for which this changer will work can be single or dual spindle, and the changer should be capable of handling two tool blocks at a time, although it can be programmed to handle only one block at a time. Because of the inherent flexibility of the changer's grip hand, extreme positioning accuracy is not required. In order to both load and unload parts or work holding fixtures and change tool blocks, the robot changer must be capable of two separate programs. In operation, the robot will normally operate in the program to load and unload workpieces and, upon a signal, it will automatically operate in the tool block changing cycle. Upon completion of the tool change program, it will automatically return to the program of loading and unloading workpieces from the turning machine.

We claim:

1. A quick change tool block system for use on various types of turning machines, comprising a tool block holder mounted on a turning machine and a generally rectangular tool block adapted to be shifted between said holder and a set-up fixture, means to shift said tool block between said fixture and holder, said holder including a body member having a pair of oppositely disposed parallel horizontal dovetail recesses and a vertical key extending from the upper dovetail, said lower dovetail being vertically reciprocable and said upper dovetail being integral with said body member, means to vertically reciprocate said lower dovetail, and said tool block includes a body member having a rearwardly projecting portion forming a pair of complementary parallel horizontal dovetails cooperating with said dovetail recesses and with a central vertical keyway complementary with said key, said tool block being insertable into said holder in a direction normal to the longitudinal axis of said dovetail recesses with the lower dovetail retracted, said lower dovetail being reciprocated upwardly to lock said tool holder against said upper dovetail recess and key, and a generally cylindrical gripping surface formed at each end of the tool block body member with an upper integral support ledge for each gripping surface, said gripping surfaces and ledges cooperating with a gripping member on said shifting means.

2. A quick change tool block system as set forth in claim 1, including air pressure actuating means for reciprocation of the lower dovetail.

3. A quick change tool block system as set forth in claim 1, in which said tool block body member includes elongated slots to receive cutting tools suitably secured therein.

4. A quick change tool block system as set forth in claim 3, in which the cutting tool surfaces project below the body member to engage a workpiece in the turning machine.

5. A quick change tool block system as set forth in claim 1, in which said shifting means includes a robot arm rotatable between the tool block holder and the set-up fixture with gripping jaws adapted to engage the gripping surfaces of said tool block.

6. A quick change tool block system as set forth in claim 5, in which said support ledges provide support for the tool block in the robot jaws if the gripping power of the robot arm fails.

7. A quick change tool block system as set forth in claim 1, in which said support ledges are circular flanges located at the upper ends of said gripping surfaces above the tool block body member.

* * * * *